United States Patent [19]
Wilkinson

[11] Patent Number: 5,860,219
[45] Date of Patent: Jan. 19, 1999

[54] TEMPLATES FOR POSITIONING OUTLET BOXES

[76] Inventor: Carl E. Wilkinson, 11592 No. County Rd. 300E, Brazil, Ind. 47834

[21] Appl. No.: 820,809

[22] Filed: Mar. 19, 1997

[51] Int. Cl.$^6$ ............................................. G01B 5/00
[52] U.S. Cl. ................................. 33/528; 33/DIG. 10
[58] Field of Search ........................ 33/528, DIG. 10, 33/15 D, 464, 770

[56] References Cited

U.S. PATENT DOCUMENTS

| | | | |
|---|---|---|---|
| 3,522,658 | 8/1970 | Howell | 33/528 |
| 3,678,588 | 7/1972 | Isola et al. | 33/528 |
| 3,875,669 | 4/1975 | Hull | 33/528 |
| 4,228,592 | 10/1980 | Badger | 33/DIG. 10 |
| 4,696,113 | 9/1987 | Rice | 33/DIG. 10 |
| 5,222,303 | 6/1993 | Jardine | 33/528 |
| 5,357,683 | 10/1994 | Trevino | 33/528 |
| 5,615,490 | 4/1997 | Burchell | 33/528 |

FOREIGN PATENT DOCUMENTS

| | | | |
|---|---|---|---|
| 2154010 | 8/1985 | United Kingdom | 33/1 SD |

*Primary Examiner*—Thomas B. Will
*Attorney, Agent, or Firm*—H. John Barnett

[57] ABSTRACT

A plurality of flat templates, each of which has the outline of an electric outlet box cut therein. A pair of slot-like openings are also cut in the template for weaving the template onto a wallboarder's square, or a carpenter's square. The template slides along the long member of the square to position and install the outlet boxes according to the building specifications. The template is then used to accurately position the corresponding cutout openings in the corresponding wallboard, sheeting or paneling. The apparatus can also be used to install ceiling outlets, and to accurately position the corresponding cutout openings in the ceiling wallboard, sheeting or paneling.

7 Claims, 3 Drawing Sheets

TEMPLATES FOR POSITIONING OUTLET BOXES

BACKGROUND OF THE INVENTION

This invention relates to a simple template system adapted for use with a wallboarder's square to position electrical outlet boxes and openings on paneling, sheeting and wallboard. It is important that the outlet boxes be positioned uniformly on the studs, and that the openings in the paneling, sheeting or wallboard be accurately positioned over the outlet boxes.

DISCUSSION OF THE PRIOR ART

The following patents are directed to devices for positioning outlet boxes and the corresponding openings through the finish paneling, sheeting or wallboard:

| U.S. Pat. No. | Inventor | Date |
| --- | --- | --- |
| 4,951,395 | Lameiro | 1990 |
| 5,111,593 | Gehen, Sr. | 1992 |
| 5,193,279 |  | 1993 |
| 5,222,303 | Jardine | 1993 |
| 5,348,274 | Breen | 1994. |

The Lameiro '395 patent describes a drywall cutting tool having a female plate with a center opening to outline the outlet box, and a male plate having a cutting blade which is positioned on the outlet box. The female plate is connected to an arm lever which is operated to cut an outlet box opening in the drywall. This tool is complex, and relies on the position of the male plate to accurately position the opening. It requires vertical positioning of the drywall before nailing it to the studs to cut the opening in the drywall while it is held in the vertical position against the studs.

Gehen '593 describes a template which includes a sliding, vertically adjustable means to set the height. The outlet box is mounted in the tool by a spring-loaded clamp. U. S. Pat. No. 5,193,279 is directed to a sheetrock cutting tool apparatus which includes a housing mounting. A T-square is used to position the cutting tool on the sheetrock.

Jardine '303 describes a template which includes an integral portion for measuring the vertical distance from the floor. For box placement heights greater than the length of the integral portion, a plumb bob may be secured to the integral portion.

Breen '274 relates to an electrical outlet box locator which comprises a locating block with a handle and means for holding an outlet box. An elongated rod is slidably received in the locating block, and can be locked at a desired height for positioning an outlet box.

Most of the above devices are complex, and, therefore, they are more expensive to manufacture. Jardine's device is limited in application, unless a plumb bob is added. The complexity makes most of these systems difficult to understand, and therefore, difficult to use.

The present invention provides simple templates which are easily mounted on the wallboarder's square. When slide onto the square, these templates can be accurately positioned to mark the wallboard, paneling or sheeting for the cuts to be made for the respective single, double or ceiling outlet boxes.

SUMMARY OF THE INVENTION

The present invention provides a much simpler means for accurately positioning electrical outlet boxes, and for accurately positioning the corresponding cutout openings in the overlying wallboard, sheeting or paneling. The invention comprises a plurality of flat templates, each of which has the outline of an electric outlet box cut therein. A pair of slot-like openings are also cut in the template for weaving the template onto a wallboarder's square, or a carpenter's square. The template slides along the long member of the square to position and install the outlet boxes according to the building specifications. The template is then used to accurately position the corresponding cutout openings in the corresponding wallboard, sheeting or paneling. The apparatus can also be used to install ceiling outlets, and to accurately position the corresponding cutout openings in the ceiling wallboard, sheeting or paneling.

The novel template of the invention utilizes the conventional wallboarder's square or carpenter's square, both of which are already in use at the construction site. The templates may be made of inexpensive plastic sheet which is cut out according to the appropriate outlet box design and which also includes the two slot-like openings through which the longer member of the square is woven to slidably attach the template to the square.

An important feature of the invention is that the template is designed to be slidably attached to a wallboarder's square, or a carpenter's square, tools which are already in use on the job site. The same combination of template and square may be used to mark the electrical outlet position, and then to position the necessary cut in the wallboard, paneling or sheeting.

Any simple means for slidably attaching the template to the square is contemplated. If a more permanent template is desired, a grooved opening to receive the blade of the square in the same plane as the plane of the template may be employed instead of the slot-like openings in the template, by which it is woven onto the blade of the square in the less expensive, preferred embodiment of the invention.

Conventional means for holding the template in position on the blade of the wallboarder's, or carpenter's, square may be used. Set screws, a nylon facing on either or both of the grooves' inner surfaces, or spring means disposed inside either, or both, inner surfaces are contemplated.

The template may also be made of other materials such as stiff paper, thin cardboard, metal and thin fiber board. Any material which retains a stiff shape and slides along the wallboarder's square, or carpenter's square which will keep its position when positioned on the square for marking the wallboard, sheeting or paneling may be used.

The template/square combination is then used to mark the positions of the outlet boxes in the construction framing. After the boxes are marked, the template/square combination is used to mark the corresponding openings to be cut out in the wallboard, sheeting or paneling. When the template is used accurately, the corresponding openings in the wallboard, sheeting or paneling should exactly register with the subsurface electric outlet boxes. The wallboard, sheeting or paneling are preferably marked, and the openings cut prior to installation as part of the wall.

DETAILED DESCRIPTION OF THE INVENTION

Figure 1:
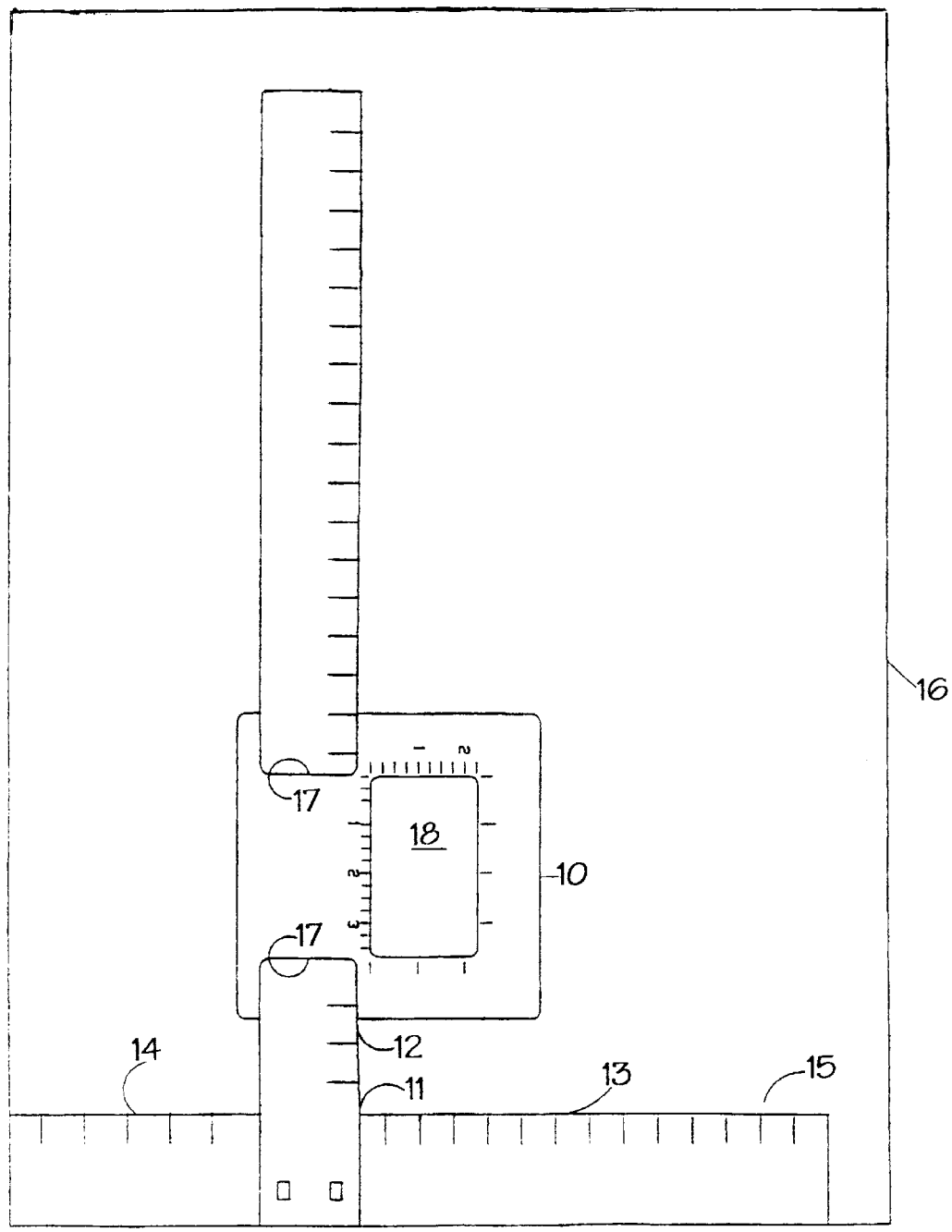
FIG. 1 is a plan view, with some parts broken away, showing one embodiment of the template slidably mounted on a wallboarder's square, and positioned along the edge of a vertically oriented sheet of wallboard.

As shown in FIG. 1 of the drawings, a flat, thin template 10 is slidably mounted onto a wallboarder's square 11 on the long member 12, which is 48" long (½ the length of conventional wallboard). The square 11 includes a cross member 13 which has a short, 6" extension 14, and a longer, 16" extension 15. Extensions 14 & 15 total 22" in length, which is 2" less than ½ the width of the wallboard, sheeting or paneling, which is 48" wide.

In FIG. 1, the combination of the template 10 and wallboarder's square 11 is shown superimposed over a standard 4' by 8' wallboard sheet 16. The long member 12 is passed through the slot-like openings 17 along one side of the template 10. The openings 17 are slightly greater in length that the 2" width of the long member 12, and openings 12 are limited in width so that some force is required to slide the template 10 along the long member 12. The template 10 will therefore remain in place in a set position until it is intentionally moved by the wallboard installer.

Also included in the template 10 is a larger single opening 18, which exactly corresponds in size to the outlet boxes (not shown) which are to be installed. If a double size outlet box is specified, the template 10 to be used will have a double size opening 18.

The cutout opening 18 is exactly positioned on the wallboard sheet 16, and the outline of the outlet box is marked on the sheet 16. The opening (not shown) for the outlet box is then cut into the marked wallboard sheet 16 by any conventional method, such as an electric sabre saw.

Figure 2:
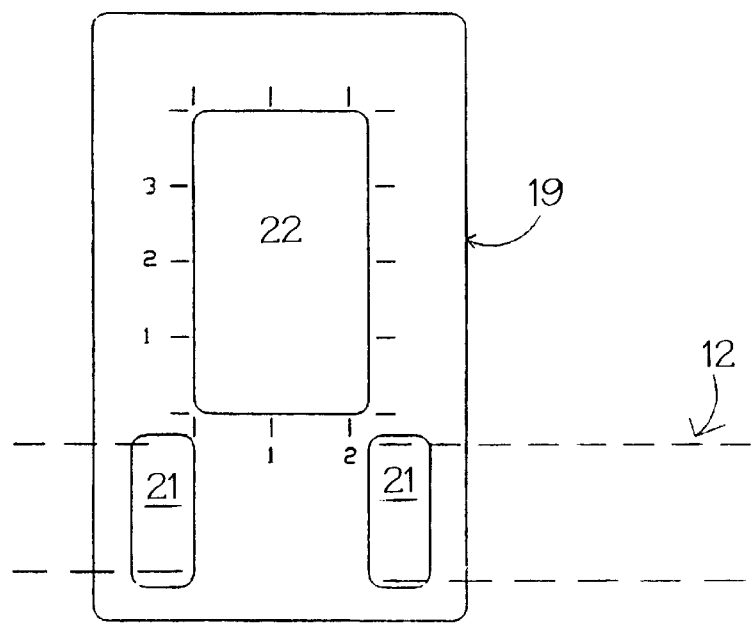
FIG. 2 is a plan view of another embodiment of the template showing a wallboarder's square in phantom for use on horizontally oriented wallboard.

Some wallboarders prefer to install wallboard with the long axis horizontal. FIG. 2 shows a template 19 which can be used to position outlet boxes on horizontally disposed wallboard sheets. As can be seen in FIG. 2, the slot-like openings 21 of the template 19 have their long axes in the vertical plane, so that openings 21 are adapted to be slidably mounted on a horizontally disposed long member 12 of a wallboarder's square 11. The vertical height of the larger single opening 22 is now determined by the extensions 14 and 15 of the crossmember 13. The horizontal position of the template 19 is now established by sliding the template 19 along the horizontally disposed long member 12.

Figure 3:
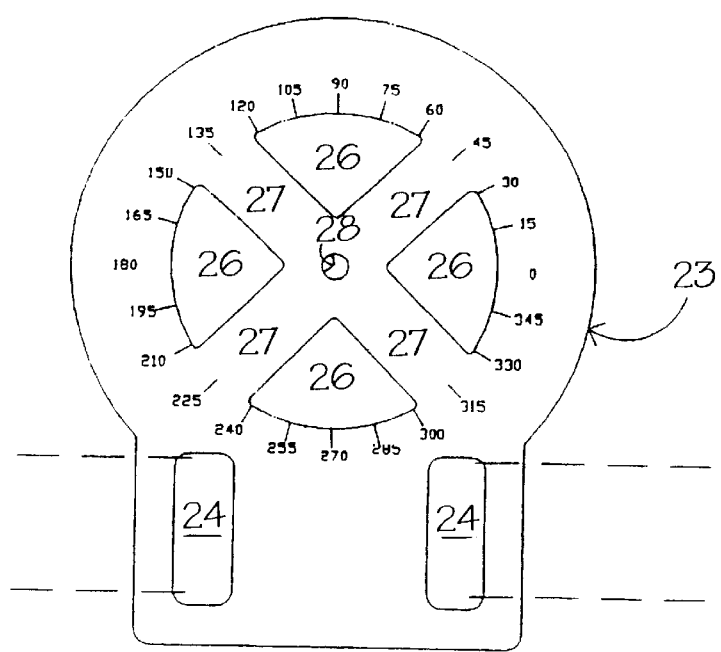
FIG. 3 is a plan view of another embodiment of the template, with the wallboarder's square again shown in phantom, for locating the opening for a ceiling fixture.

FIG. 3 shows a ceiling fixture template 23. The template 23 includes a pair of slot-like openings 24 along one side thereof. A larger, circular opening is defined by four identical, pie-shaped openings 26. Cross members 27 intersect at the center of the circular opening, and a small opening 28 is provided at the center of cross members 27 to mark the center of the ceiling outlet box (not shown).

As before, template 23 is slid along the long member 12 of a wallboarder's square 11 to establish the correct position of the ceiling fixture on the wallboard sheet. For convenience, the required opening can be cut in the wallboard sheet before it is raised into position, and installed permanently.

Figure 4:
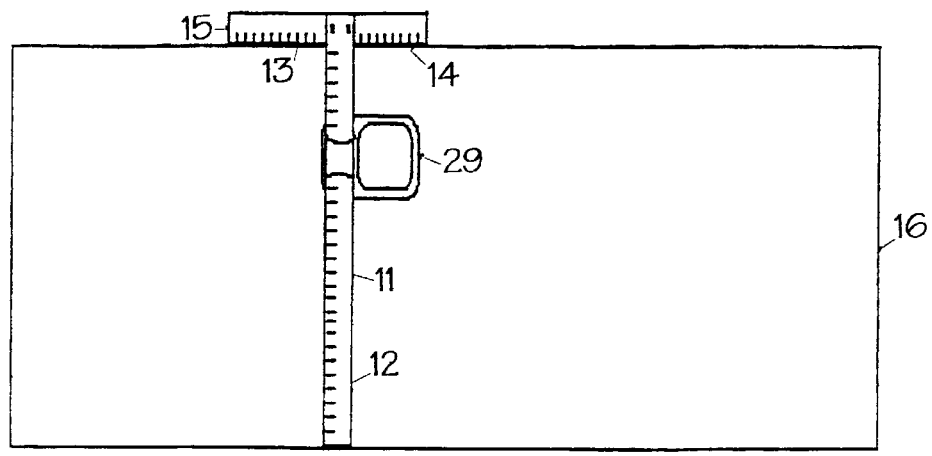
FIG. 4 is a schematic diagram showing a horizontally oriented wallboard and a double outlet box template slidably mounted on a wallboarder's square.

As seen in FIG. 4, the wallboard 16 may be oriented with its length horizontal, if this is preferred. FIG. 4 shows one way to position the outlet box opening. The long member 12 of the wallboarder's square 11 is oriented vertically, and is moved horizontally across the top (side) of the wallboard 16. A double outlet box template 29 is shown in FIG. 4.

Of course, any desired template could be used, such as the template 19 shown in Fig.2. When using template 19 on a horizontally oriented wallboard 16, The wallboarder's square 11 should be oriented with its long member 12 extending horizontally across the wallboard 16, and the wallboarder's square would be moved vertically on the wallboard 16.

Figure 5:
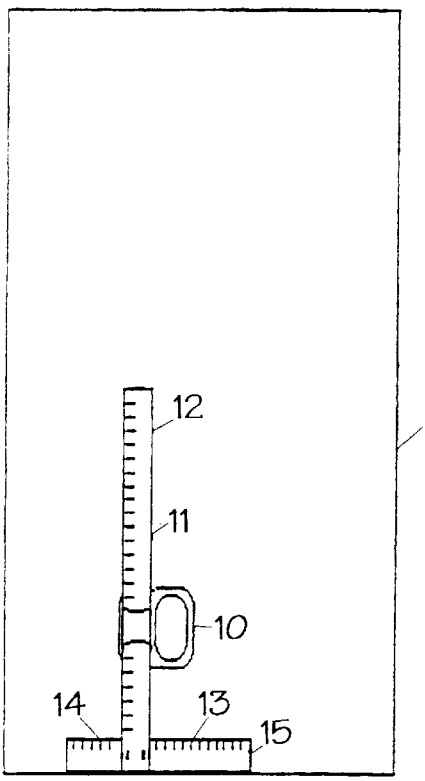
FIG. 5 is a schematic diagram showing a single outlet box template slidably mounted on a wallboarder's square and a vertically oriented wallboard.
Figure 6:
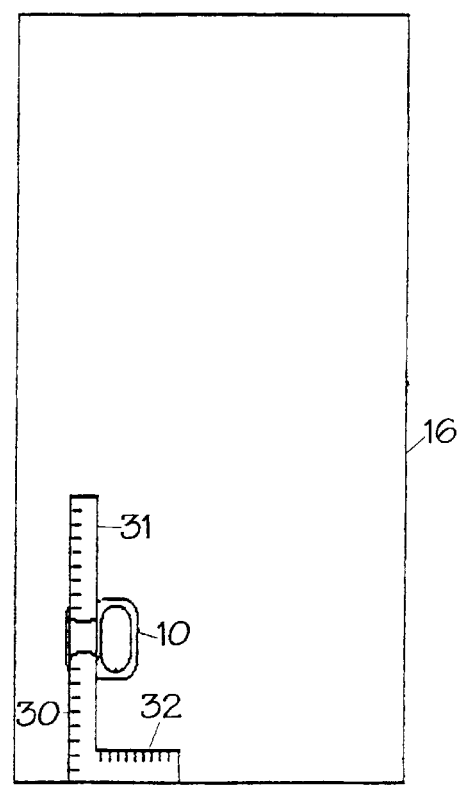
FIG. 6 is similar to FIG. 4, but showing a single outlet box template slidably mounted on a carpenter's square.

FIG. 5 is similar to FIG. 1, and FIG. 6 is a variation of FIG. 1, showing the use of a carpenter's square 30, with a long dimension leg 31 oriented vertically, and a shorter, right angle leg 32 extending along the lower edge of the wallboard 16. There are many sizes of carpenter's squares, but one is preferred which has a long dimension leg of 48" with a width of 2", and a shorter, right angle leg 32 which is 24" long.

Other templates can be designed quickly, and fabricated inexpensively for accurately positioning required openings in wallboard, sheeting or paneling. The important feature of the invention is that the templates are adapted to be combined with a standard wallboarder or carpenter square to accurately position electric outlet box openings in the wallboard, sheeting or paneling.

What is claimed is:

1. An improved template for accurately positioning electrical outlet boxes and the corresponding openings in the overlying wallboard, sheeting or paneling at a construction site, comprising:

a unitary piece of substantially flat, stiff material having a plurality of openings therein, said material being sufficiently flexible to allow the piece to be woven onto a wallboarder's square or a carpenter's square through at least two of said openings, said two openings providing guide means attaching said template to a wallboarder's square or a carpenter's square to slidably receive the long member of said square therethrough;

a larger opening corresponding to the dimensions of an electrical outlet box, and adapted to mark the outline of the corresponding outlet box on a wallboard, sheeting or paneling after first accurately positioning the template on the wallboard, sheeting or paneling.

2. The improved template of claim 1, in which the flat piece is relatively thin, and including at least three openings therein;

identical first and second openings being disposed with their long axes parallel to each other, and adapted to slidably receive the long member of a wallboarder's square or a carpenter's square woven therethrough with sufficient friction between the template and the long member to hold the template in the place set by the user;

a third, larger opening corresponding to the dimensions of an electrical outlet box for marking the outline of the outlet box on a wallboard, sheeting or paneling after first accurately positioning the template on the wallboard, sheeting or paneling.

3. The improved template of claim 2, in which the template material is selected from materials of the group consisting of plastic, paper, metal and fiber board which can be fabricated into thin, substantially flat, stiff templates capable of being mounted on a wallboarder's square, or a carpenter's square to slide thereon, but with some resistance so that a set position can be maintained solely by means of the friction between the template and the long member of the wallboarder or carpenter's square.

4. The improved template of claim 3, in which the opening for outlining the electrical outlet box is oriented with its long axis parallel to the long axes of the identical first and second openings therein.

5. The improved template of claim 3, in which the opening for outlining the electrical outlet box is oriented with its long axis perpendicular to the long axes of the identical first and second openings therein.

6. The improved template of claim 3, in which the opening for outlining the electrical outlet box is for a double outlet box.

7. The improved template of claim 3, in which the third opening for outlining the electric outlet box comprises a plurality of pie-shaped openings having a overall outline corresponding to a circular electrical outlet box, said pie-shaped openings being separated by cross members which intersect at the center of the outline in a smaller center opening for marking the center of said outline on a wallboard.

* * * * *